(12) United States Patent
Chavez et al.

(10) Patent No.: US 7,506,257 B1
(45) Date of Patent: Mar. 17, 2009

(54) SYSTEM AND METHOD FOR PROVIDING HELP CONTENTS FOR COMPONENTS OF A COMPUTER SYSTEM

(75) Inventors: Anthony Chavez, Bothell, WA (US); Davide Massarenti, Redmond, WA (US); Ghim-Sim Chua, Redmond, WA (US); Pierre Jacomet, Kirkland, WA (US); Sridhar Chandrashekar, Redmond, WA (US); Majeed D. Salman, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 262 days.

(21) Appl. No.: 09/607,374

(22) Filed: Jun. 30, 2000

Related U.S. Application Data (60) Provisional application No. 60/141,757, filed on Jun. 30, 1999.

(51) Int. Cl.
*G06F 3/00* (2006.01)
*G06F 9/44* (2006.01)
*G06F 11/00* (2006.01)
*G06F 12/14* (2006.01)

(52) U.S. Cl. .................. 715/714; 715/712; 717/168; 714/37; 726/21

(58) Field of Classification Search ............ 345/705, 345/712, 713, 749, 740, 714; 707/104.1; 717/168, 171; 726/21; 714/37, 38; 715/705, 715/712, 713, 749, 740, 714
See application file for complete search history.

(56) References Cited

U.S. PATENT DOCUMENTS 5,276,860 A    1/1994   Fortier et al.
5,361,361 A *  11/1994  Hickman et al. ............ 345/705
5,367,667 A    11/1994  Matson et al.
5,483,632 A *  1/1996   Kuwamoto et al. ......... 715/708
5,524,190 A    6/1996   Schaeffer et al.

(Continued)

FOREIGN PATENT DOCUMENTS

EP    0625752    11/1994

(Continued)

OTHER PUBLICATIONS

Bienz, Tim. et al. "Portable Document Format Reference Manual, Version 1.2" Nov. 12, 1996. Adobe Systems Incorporated. pp. 65-74.*

(Continued)

*Primary Examiner*—Dennis-Doon Chow
*Assistant Examiner*—Blaine T. Basom
(74) *Attorney, Agent, or Firm*—Merchant & Gould (57) ABSTRACT

A system and method for providing help contents uses a framework for unified help access that provides a single point of entry through which a user may access help contents relating to all system software and hardware components. The help contents from different sources are organized into a taxonomy structure that allows a user to navigate easily to locate relevant help topics. The contents of the help topics may reside locally or be accessible over the Internet, and may contain static as well as active components. The unified help framework is extensible, allowing the help topics and the taxonomy to be updated by means of update packages. The application for providing the unified presentation of help topics may be launched by a user as well as from programs.

16 Claims, 7 Drawing Sheets

U.S. PATENT DOCUMENTS

| | | | |
|---|---|---|---|
| 5,715,462 | A | 2/1998 | Iwamoto et al. |
| 5,825,356 | A * | 10/1998 | Habib et al. ............... 345/712 |
| 5,917,485 | A * | 6/1999 | Spellman et al. ......... 707/500.1 |
| 6,185,587 | B1 * | 2/2001 | Bernardo et al. ............ 707/513 |
| 6,208,338 | B1 * | 3/2001 | Fischer et al. .............. 345/705 |
| 6,236,989 | B1 * | 5/2001 | Mandyam et al. .............. 707/4 |
| 6,380,957 | B1 * | 4/2002 | Banning ..................... 715/828 |
| 6,456,303 | B1 * | 9/2002 | Walden et al. .............. 345/705 |
| 6,999,990 | B1 * | 2/2006 | Sullivan et al. ............. 709/205 |

FOREIGN PATENT DOCUMENTS

| | | |
|---|---|---|
| GB | 2329046 | 3/1999 |
| WO | 9912101 | 3/1999 |

OTHER PUBLICATIONS

Sleeter, Melissa E. "OpenDoc—Building Online Help for a Component-Oriented Architecture." Proceedings of the 14th Annual International Conference on Systems Documentation: Marshaling New Technological Forces: Building a Corporate, Adademic, and User-Oriented Triangle. Oct. 1996. ACM Press. pp. 87-94.*

Irwin, Dee. et al. "Managing On-Line Help in a Networked Multi-Platform Environment." Proceedings of the 23rd Annual ACM SIGUCCS Conference on User Services: Winning the Networking Game. Nov. 1995. ACM Press. pp. 157-160.*

Netscape Communications Corporation: "NetHelp 2.0 Authoring Guide" Nethelp 2.0 SDK Documentation, 'Online! Sep. 3, 1997, pp. 1-21, XP002155041.

C. Levin: "Web Repair Shops" PC Magazine: Trends Online, 'Online! Aug. 11, 1998, pp. 1-3, XP002155042.

Netscape Communications Corporation: "Establishing trust for downloaded software" Netscape Object Signing, 'Online! Jul. 2, 1997, pp. 1-18, XP002155043.

Netscape Communications Corporation: "SmartUpdate Developer's Guide" Devedge Online Documentation, 'Online! Mar. 11, 1999, pp. 1-83, XP002155044.

R. Binns, J. Winstead: "A standard for Linux packages and version numbering" Linux Specification Document, 'Online! Aug. 24, 1993, XP002155045.

Iffland et al: "ISDN Applications: Their Identification and Development" IEEE Network: The Magazine of Computer Communications, US, IEEE INC New York, vol. 3, No. 6, Sep. 1, 1989 pp. 6-11.

"Safe Installation of Object-Oriented Class Libraries Common to multiple Software Products" IBM Technical Disclosure Bulletin, US, IBM Corp. New York, vol. 37, No. 2B, Feb. 1, 1994, pp. 407-409.

Collinson: "Putting old software back together again" EXE vol. 13, No. 6, Nov. 1998 pp. 45-48.

* cited by examiner

SYSTEM AND METHOD FOR PROVIDING HELP CONTENTS FOR COMPONENTS OF A COMPUTER SYSTEM

CROSS REFERENCE TO RELATED APPLICATIONS

This application claims the benefit of provisional patent application 60/141,757, filed Jun. 30, 1999.

TECHNICAL FIELD OF THE INVENTION

This invention relates generally to computer systems, and more particularly to the provision of help information and features for various software and hardware components of a computer system.

BACKGROUND OF THE INVENTION

As the operating systems, applications, and hardware components of modern computer systems become increasingly complicated and offer more features and functions, even an experienced user would from time to time encounter questions relating to various aspects of her computer system. Such questions may include, for example, how to use a particular feature of an application or a hardware device, how to modify various settings of the system, how to find out what is wrong when the computer is not performing as expected and how to fix it, etc. In the early days of the personal computing era, each piece of computer software and hardware by reputable vendors typically came with one or more user's manuals, most of them tended to be either too voluminous and difficult for average users to use, or not comprehensive enough to provide answers to many questions a user might have. Moreover, many of them were not well organized to allow a user to find the right information easily. It was all too often that a user would dig through several volumes of manuals, and still could not find the information needed.

As more computer processing power and system memory became available, there was a significant improvement in the way computer help information was provided to the users. Specifically, help information regarding a software program or a hardware device may be organized by the vendor of that product into different help topics that a user can access and view on the computer. For instance, if the user has question about a function or feature of an application, she can click on the help option on the menu bar and then try to find the help topic that provides the information. In addition to selected help topics, an application or device may provide tours and/or tutorials to teach the user how to use the features and functions of the product. As the Internet has become popular and widely accessible, many software and hardware vendors have also set up online support centers on the World Wide Web, where a user can search for technical information and obtain online technical support for diagnosis and troubleshooting. These newer approaches of providing help information have become so popular that many software and hardware products nowadays do not even come with old-fashioned paper manuals.

Nevertheless, even with all the help topics and online support available, a user today may still find it a frustrating experience trying to locate the right help topics for her questions or problems concerning her computer system. Often, a question may be of a relatively general nature and could involve several software and hardware components, and the user has no idea which component is responsible for the problem. In order to find the answer, the user may have to go through the help contents of each of the components. Thus, with respect to the applications, the user has to launch each of the applications and search through the help topics it provides. Similarly, for a hardware component, the user has to locate and launch the help program for that component and then go through its help topics. If the answer still cannot be found, the user may have to access the various vendor Web sites and go through the information provided there. In doing so, the user often finds that the applications, hardware devices, and vendor Web sites each has its own way of organizing help contents and its own terminology, making it more difficult to navigate through the help contents to find the information needed. This process not only can be very time consuming but also can cause significant frustration of the user. The unsatisfactory user experience in finding useful help topics also leads to higher costs of technical support services of the software and hardware vendors, as a user encountering a problem may be more inclined to call for help rather than trying to find the answer by herself.

SUMMARY OF THE INVENTION

In view of the foregoing, the present invention provides a framework that unifies help contents from different sources and provides a single point of entry through which a user may access help contents relating to different system software and hardware components. In this unified help framework, a help service maintains a database that contains data identifying a plurality of help topics pertaining to components of the computer system. The plurality of help topics are presented in a user interface based on the data in the database to allow a user to locate a help topic of interest. For instance, the help contents may be presented in accordance with a taxonomy structure that allows a user to navigate through easily to locate a help topic of interest. The user interface may also provide keyword and index search options. The contents of the help topics may reside locally or be accessible over the Internet, and may contain static as well as active components, such as scripts. The unified help framework is extensible, allowing the help topics and the taxonomy to be updated by means of update packages. The application for providing the unified presentation of help topics can be launched by a user as well as from programs.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
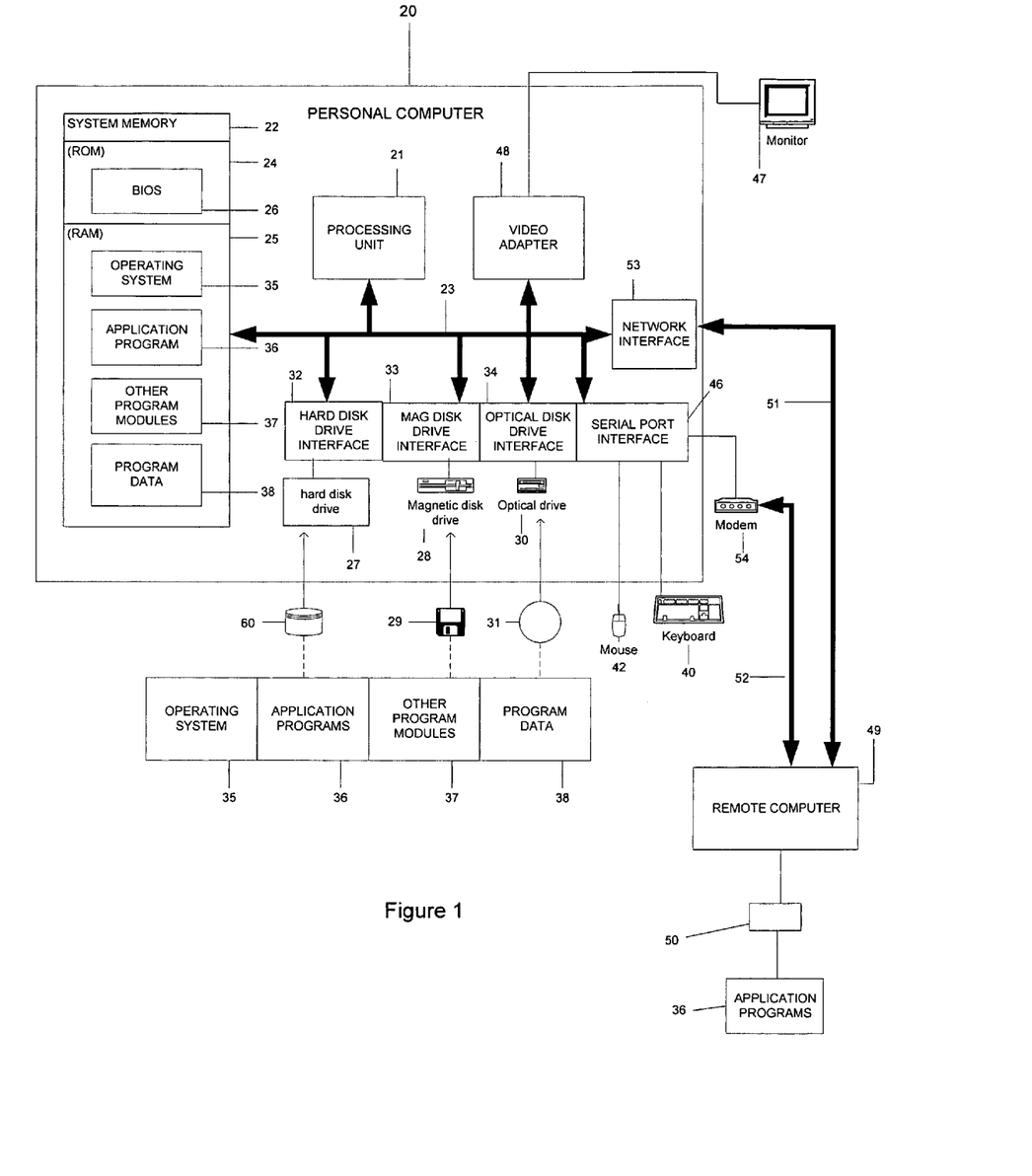
FIG. 1 is a block diagram generally illustrating an exemplary computer system on which the present invention resides.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal % computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
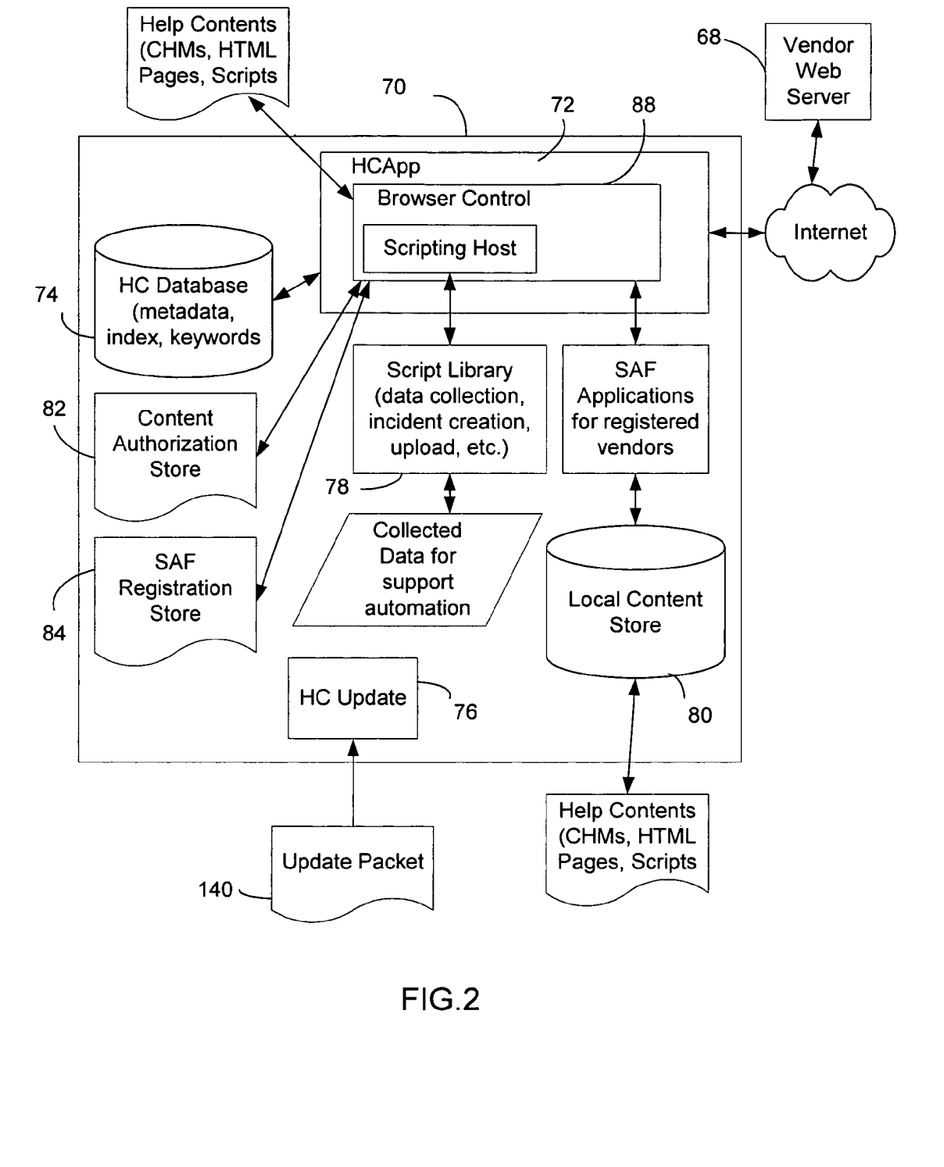
FIG. 2 is a schematic diagram showing an embodiment of a Help Center for providing access to help contents in accordance with the unified help framework of the invention.

Referring now to FIG. 2, the present invention is directed to a framework for providing access to help contents that offers unified organization and presentation of help topics and other types of user-help features, such as trouble shooting and tutorials, etc., to enable a user to get the needed help easily and quickly. A feature of the invention is the provision of a single point of entry (or portal) through which the user can find help contents pertaining to various software and hardware components installed on the computer system, and such help contents may be either stored locally or obtained online and include both static and active contents. By providing all help features through a single point of entry in an organized and coherent way that facilitates easy navigation, the unified help framework of the invention eliminates the major cause of user frustration in getting needed help with conventional systems. The user no longer has to search for help topics and features that are scattered all over the system and various vendor Web sites and can only be accessed by launching individual applications or connecting to individual Web sites.

FIG. 2 shows an embodiment of the unified help framework in accordance with the invention. In this embodiment, the unified help functionality is provided by a Help Center 70. The main architecture of the Help Center 70 is made up by the following components: a Help Center Application 72, a Help Center Database 74, a Help Center Update program 76, a Script Library 78, a Local Content Store 80, a Content Authorization Store 82, and a Support Automation Framework (SAF) Registration Store 84. The functions of each of these components and how they interact to provide the unified help are described in greater detail below.

Turning first to the Help Center Application (HCApp) 72, this component is the center piece of the architecture of the Help Center 70 and cooperates with the other components to provide the unified help functionality. One function of the HCApp 72 is to provide the single point of entry for accessing all available help contents as described above. To that end, the HCApp 72 is responsible for providing a user interface that presents the available help topics and other help options for all software and hardware components of the computer system in a well-organized form that the user can navigate through to locate the desired help contents. In one implementation, the primary mode of display of user interface is an Internet Explorer (Microsoft) browser control 88, and the various help contents are included in HTML pages that may be static or have active contents, such as scripts.

Figure 3:
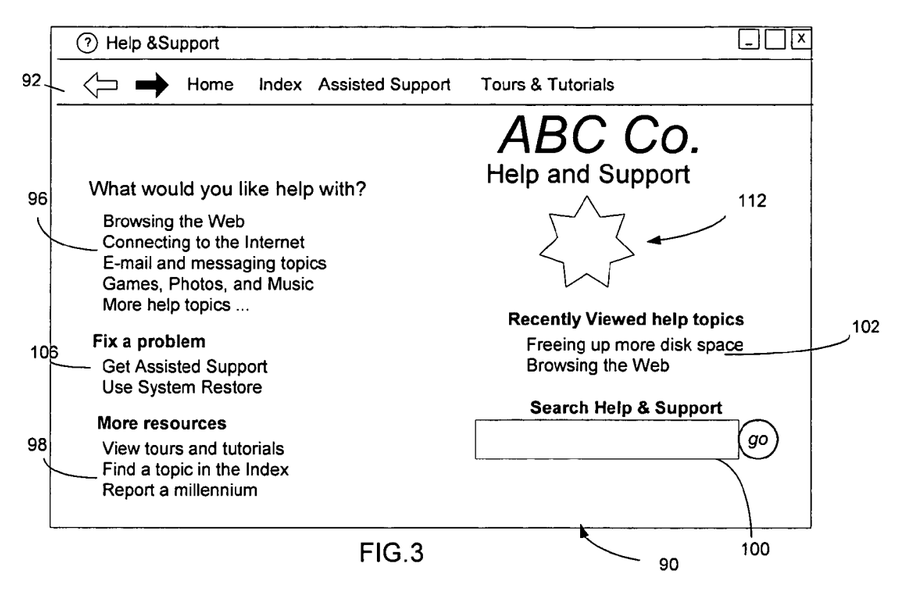
FIG. 3 is a schematic diagram showing a user interface window provided by a Help Center Application that serves as a single point of entry for accessing help contents for multiple system components.

For illustration purposes, an exemplary user interface window 90 that may be presented by the HCApp 72 as a home page is shown in FIG. 3. In this exemplary user interface, a navigation bar 92 provides direct access to top-level pages, home, back, and exit functionality. A portion 96 of the core area of the window, which is entitled "Look for help" in the illustrated example, presents a taxonomy structure, which will be described in greater detail below, for the user to locate relevant help topics. Another portion 98 of the window 90 provides other help options, such as viewing tours and tutorials, finding a help topic in an index of help topics, etc. A search bar 100 allows the user to enter a keyword for a keyword search on the available help contents. The window also includes a portion 102 that presents a list of help topics that have been used recently. In accordance with an aspect of the invention, active help contents may be offered to help the user fix a problem by trouble shooting or using system restore. In the illustrated example, those help options are presented in the portion 106 of the window entitled "Fix a problem."

As the user goes through the process of locating the help information, the core area of the window 90 can also be used to present new user interface information depending on selections made by the user. For instance, the core area may be used to display actual help contents or search results if the user selects a help topic or performs a keyword search. The user interface for self-help problem fix or support automation for escalating problems to a vendor will also be displayed in the same core area. In this regard, the author of support automation help pages is given significant flexibility in deciding what kind of user interface (e.g., HTML plus JavaScript, etc.) and how many pages to be displayed.

Figure 4:
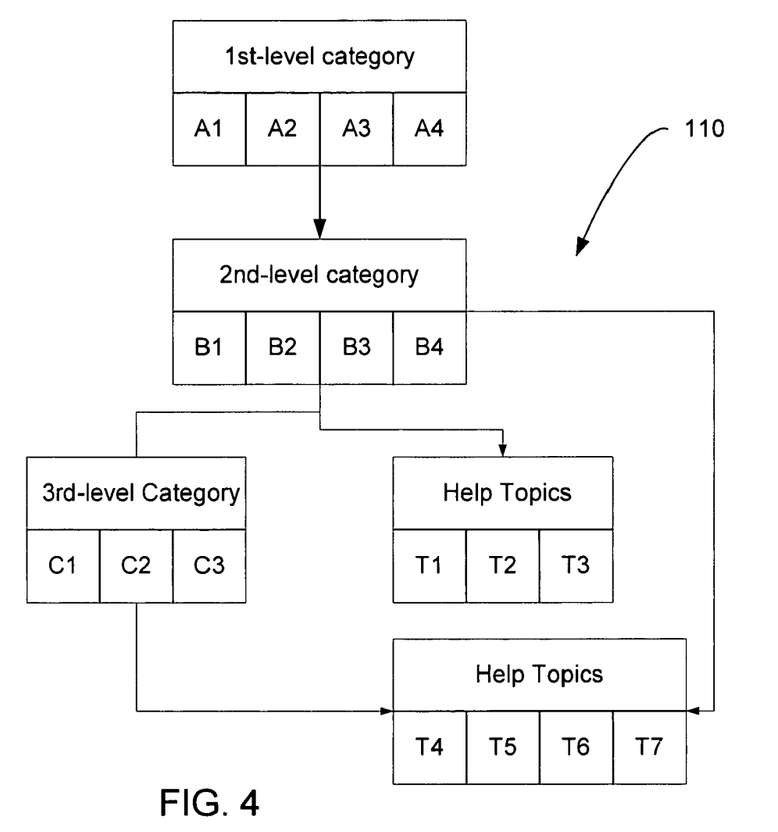
FIG. 4 is a schematic diagram illustrating an example of a taxonomy structure used in the user interface of FIG. 3 for presenting available help topics.

In accordance with a feature of the embodiment, the available help topics are organized in a taxonomy structure, which is presented by the HCApp 72 in its user interface window. The user can navigate through this taxonomy structure to locate relevant help topics. Generally, the taxonomy structure is based on a hierarchical model in which the help topics are categorized into a tree-like structure with multiple layers of categories and sub-categories. For illustration purposes, an exemplary taxonomy structure 110 is shown in FIG. 4, where A1, A2, etc. represent categories an sub-categories, and T1, T2, etc. represent help topics. Each taxonomy node has a display string and a description that can be displayed in the user interface of the HCApp and is preferably mapped to a unique ID so that the same node can be identified using various local languages. For example, the strings under the heading "Look for help" in FIG. 3 may represent the titles of the top-level categories in a taxonomy structure. When the user selects one of the top level categories, the HCApp 72 displays in the core area of the user interface window the categories and help topics (if any) on the second level of the taxonomy. By selecting a category on the second level, the HCApp displays the categories and help topics on the third level of the taxonomy. In this way, the user can navigate through the taxonomy structure until a relevant help topic is found.

The help topics in the taxonomy are the leaf nodes in the tree-like structure. In other words, a help topic does not have child nodes. Each help topic, however, may have multiple parents as shown in FIG. 4. Thus, the same help topic may exist under different taxonomy branches. In a preferred embodiment, in addition to the taxonomy structure, help topics may also be located by using a help topic index or a keyword search. It will be appreciated that not all available help topics have to be mapped into the taxonomy. For example, some help topics that are intended to be located by a keyword search may not quite fit in the taxonomy.

In accordance with an important aspect of the embodiment, the taxonomy installed on a given computer system is intended to be extensible so that category nodes on different layers and new help topics may be added, moved, or removed from the taxonomy structure using update packages as will be described in greater detail below. Thus, a vendor can customize the taxonomy by registering its own help topics and taxonomy nodes. Moreover, a vendor can also change the layout of the user interface window to customize the look and feel of the window. Thus, for example, a computer manufacturer that ships computers with software loaded may choose to design its own Help Center window to provide its own background graphics, display its logo 112, and add its own help taxonomy nodes and topics, etc. Nevertheless, in order to maintain the coherency of the taxonomy and some degree of resemblance among the taxonomy structures of different computer systems, it is preferable for the top one or two levels of categories to be predefined and used by all application and hardware vendors in designing the their customized Help Center windows and help contents.

Figure 5:
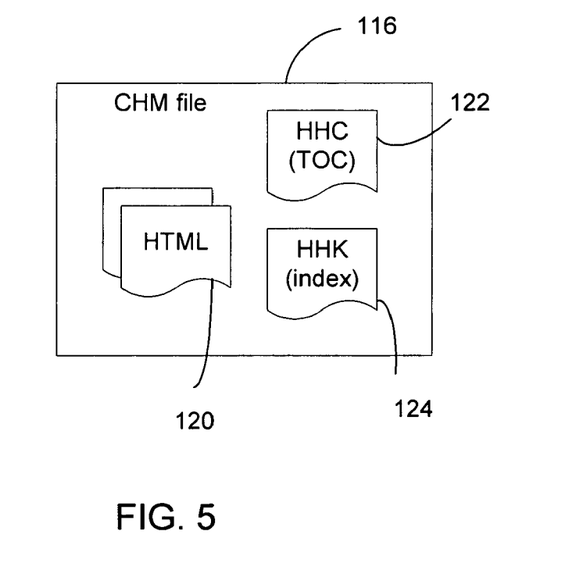
FIG. 5 is a schematic diagram showing a Compiled HTML file for storing help contents.

In a preferred embodiment, the help contents are contained in pages in the HTML (Hypertext Markup Language) and may include scripts (e.g., JavaScripts, VBScripts) and objects (e.g., applets, ActiveX/COM). The contents of a help topic may also have links or buttons that can be selected to launch other applications, applets, etc. The help contents stored locally on the computer system are preferably in the form of Compiled HTML (CHM) Help Files. As shown in FIG. 5, a CHM Help File 116 contains one or more HTML files 120 that provide contents for the associated help topic, a file 122 (referred to as an HHC file) which provides a table of contents for the CHM file, and a file 124 (referred to as an HHK file) that contains an index of the contents. Additionally, as will be described below, a file 144 (FIG. 9) (referred to as an HHT file) that contains "metadata" is used for providing the mapping between the individual help topics and the taxonomy structure. In one implementation, the HHT file 144 is written in the eXtensible Markup Language (XML) and specifies for each help topic in the CHM file the following data: the taxonomy node under which the help topic resides, the URL for the help topic, the title for the help topic, the keywords for help topic, and an optional description of the help topic. The HHT file may also contain an Action field for the help topic to specify whether the contents or mapping of the topic is being added, removed, or updated.

In accordance with a feature of the embodiment, each help topic is associated with a Universal Resource Locator (URL) that can be used to access the contents of that help topic. One important effect of using URLs to access help contents is that there is no distinction between local contents or online contents. Thus, in the case that the URL refers to a local directory, the HCApp will retrieve the contents of the help topic from that local memory space. On the other hand, if the URL refers to a directory on the Internet, such as a vendor's Web site, the HCApp will access that directory to obtain the help contents if the computer is already connected to the Internet, and preferably can initiate the connection to the Internet if the computer is not yet connected.

In a preferred embodiment, the HCApp 72 may be launched either by a user or from within an application. To launch the HCApp, the user may, for example, select the Help menu item from the Start menu. Alternatively, the HCApp may be launched by an application by calling a proper API of the system.

In accordance with an aspect of the embodiment, in some applications it may be desirable to take advantage of the HCApp to access and display the help contents of a given help topic directly, i.e., without having to go through the user interface or the taxonomy structure. To that end, in a preferred embodiment a simple "HCP" protocol is provided to allow the contents of a help topic to be accessed through the Help Center namespace. The HCP protocol is used to tell the Help Center where to retrieve the help contents that are stored on the system. The HCP protocol has the format:

hcp://<content-address>, where <content-address> may be any of the following:

| <content-address> | Description |
|---|---|
| <HTTP URL> | Extracts the contents of the URL and displays them in the browser, no matter where the contents reside. |
| <vendor>/<content name> | Refers to contents in the vendor's private directory. These contents can be added only through signed packages |

-continued

| <content-address> | Description |
|---|---|
| | and will only be referred to using HCP://. |
| system/... | Refers to contents provided by the help system, such as taxonomy and support channels for uploading problems to support centers. |

A vendor who has installed its help contents in to its private vendor folders in the Local Content Store can use its Distinguished Name (DN) as the path to the help contexts. An example of such a path is:

hcp://CN=ABC Corporation, L=San Jose, S=CA, C=US/memorystick.htm where CN=Common Name; L=Locale; S=State; and C=Country. The DN comprises several components, including CN, L, S, C, among others. It is commonly used in the Lightweight Data Access Protocol as a means to uniquely identify a datum of information. In the illustrated embodiment, the Help Center, and more specifically the Help Center Database, uses DNs to uniquely identify owners of the content.

If an author (e.g., an original equipment manufacturer (OEM), an independent software vendor (ISV), or any one who wants to provide help contents and access to the help contents via the Help Center) wishes to display the Help Center user interface other than from the root of the taxonomy structure, she can specify the URI to that path. For instance, to display the "Security" section of the help taxonomy in the Help Center user interface, the following path may be specified:

hcp://system/Taxonomy.htm?path=Security where Taxonomy.htm is an HTML file that contains a script that takes in the "path" parameter in the query string and displays the taxonomy from the "Security" level and onwards, rather than from the default top level of the hierarchy.

To access a help topic through the hcp namespace, an application may, for example, provide a launch point in an error message or a FAQ ("frequently asked questions") panel displayed to the user. When the user selects the launch point, a proper API is called to launch the HCApp. The hcp path is then used to go to the help topic, and the retrieved help contents may then be displayed.

To manage the various help topics available to the user, the HCApp 72 maintains a Help Center (HC) Database to store information about the help topics. In a preferred embodiment, the HC Database includes a table for storing the mapping between the taxonomy and the help topics. This table is used by the HCApp for displaying the taxonomy nodes and help topics for structured navigation.

Figure 6:
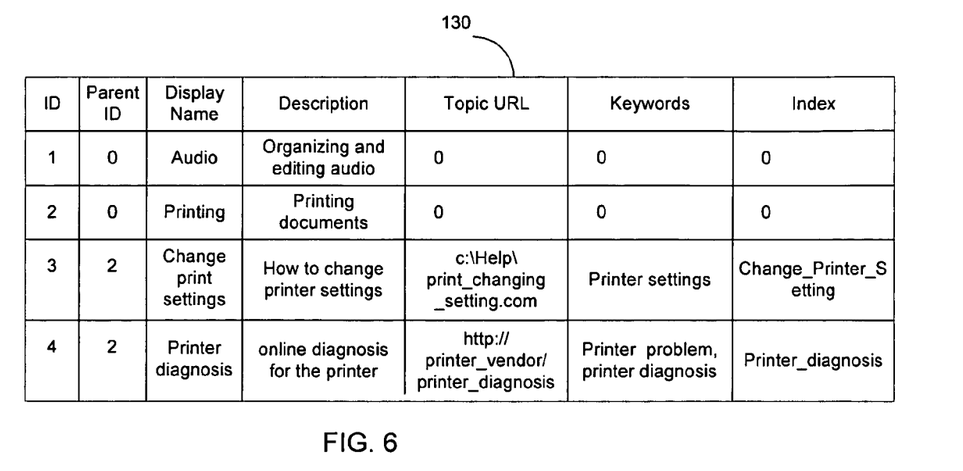
FIG. 6 is a schematic diagram showing a data structure in a Help Center Database for holding metadata for mapping help topics to the help taxonomy.

For illustration purposes, FIG. 6 shows an exemplary data structure in the form of a table 130 in the HC Database 74 for mapping the help topics to the taxonomy. There is one entry for each node in the hierarchy of the taxonomy structure. Each entry contains the following fields: an ID uniquely identifying that node, a parent ID for that node (which is NULL for top-level nodes), the display name of the node, a description (optional) of the node. If the node is a help topic (i.e., a leaf node of the taxonomy), the entry also includes a URL field containing a URL for retrieving the help contents, a keyword field that contains the keywords for identifying this help topic in a keyword search, and an index string for indexing the topic. It will be appreciated that this table in FIG. 6 is shown only as a simple example, and the entry in the database may include other fields relating to the help topic. For instance, such fields may include the type of help (e.g., help information, tutorial, diagnosis, etc.) provided, an identification of the owner of the help contents (i.e., the party that provides the help contents), etc.

Figure 7:
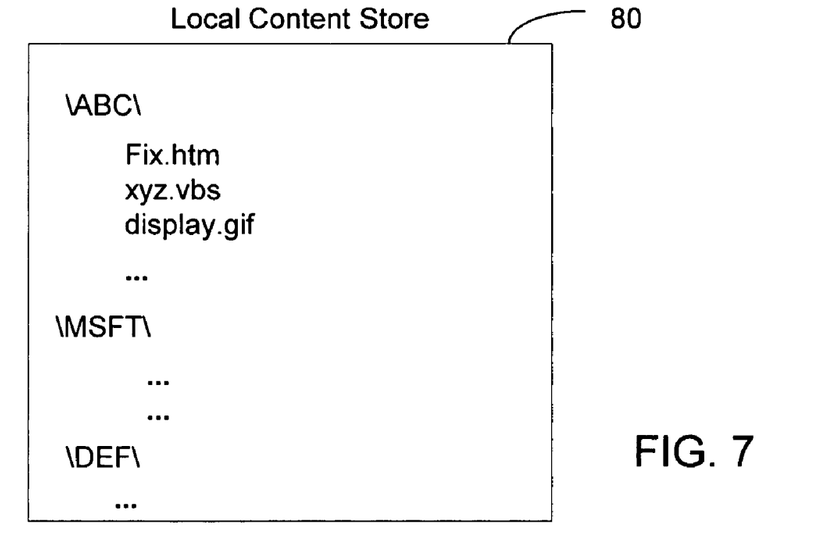
FIG. 7 is a schematic diagram showing an example of the contents of a Local Content Store of the embodiment of FIG. 2.

In the illustrated embodiment, the various help contents installed on the computer system are all registered in the local content store. The use of the local content store addresses another aspect of security concerns relating to having multiple sources for the help contents stored locally on the computer system. Specifically, one vendor should not be allowed to tamper with the help contents provided by another vendor. As will be described in greater detail below, addition and modification of trusted contents may be by means of update packages provided by vendors. To prevent one vendor from changing the trusted contents of another vendor, in one implementation as shown in FIG. 7, the help contents installed on the system are listed under their respective vendors. For example, the Help page named "fix.htm" registered by a vendor, ABC Company, is listed under ABC. Later, only an update package from ABC Company is allowed to modify or delete fix.htm. To prevent unauthorized modification of the Content Store, access to the Content store is limited only to the HCApp. In this way, the Local Content Store provides each vendor with a secured directory into which the vendor can store its active help contents.

As mentioned above, the help contents for a help topic may be active, i.e., including active components such as scripts. For instance, certain help contents provided by a vendor may provide a fix to a known problem, which may involve the use of scripts to change system settings or modify certain files. Another important and related use of scripts is for support automation, where a user presents (or "escalates") an encountered problem to a support center of the vendor over the Internet. In such a case, the vendor may provide script-based support applications (called "support channels") to collect various system operation information for problem diagnosis and upload such information to the Vendor. Moreover, once the problems are identified, fixes can also be implemented by providing scripts to the computer to perform the corrective actions.

Figure 8:
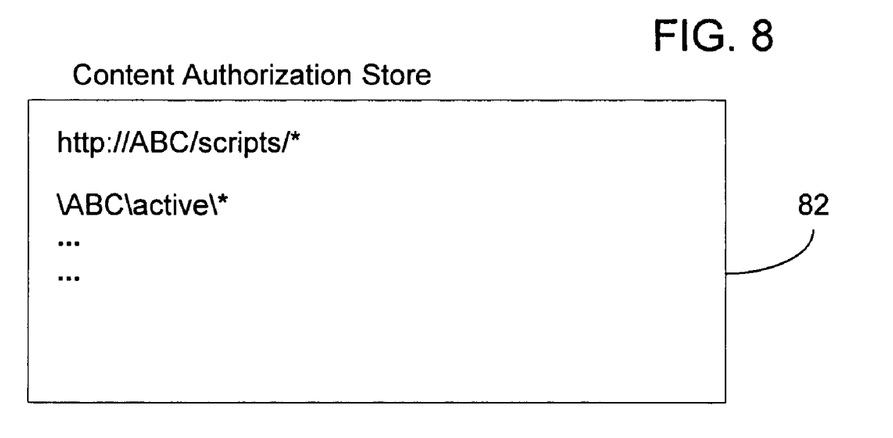
FIG. 8 is a schematic diagram showing an example of a Content Authentication Store of the embodiment of FIG. 2.

Because a script may take actions that have potential destructive effects, such as deleting critical files, the use of scripts may have serious security implications and thus should be closely controlled. In the illustrated embodiment, such control is achieved by requiring that the Script Library objects can only be accessed by "trusted" help contents that have been registered in the Authorized Content Store. As shown in the example of FIG. 8, the entries in the Content Authorization Store are the URLs for the trusted help contents, which may exist either locally or online (i.e., accessible through the Internet). When the script from the help content (e.g., a HTML Help page) requests one of the Script Library objects, the HCApp verifies that the URL of that help content is listed in the Local Content Store. Access to the Script Library objects is allowed only if the URL is found in the Content Authorization Store 82.

As mentioned above, the HCApp 72 preferably uses the Internet Explorer browser control as the primary mode of viewing the contents of a help topic, which may be active and include scripts. The IE browser control has a built-in security mechanism that will detect unknown or untrusted scripts included in the content pages and provide warnings to the user or refuse to execute such scripts. For active help contents that include scripts, the security mechanism of the IE browser control can be disruptive and may hinder the proper execution of the scripts. To avoid this problem, the trusted active contents that are registered in the Content Authorization Store 82 are allowed to bypass the IE security mechanism. In other words, scripts from the registered files or directories can be executed within the Help Center without triggering the security mechanism of the IE Browser Control.

As mentioned above, one important form of active help contents is a script-based support application provided by a vendor for automated support. Before such support applications can be used, the applications and their vendors have to be registered with the Support Automation Framework (SAF) Registration Store 84 (FIG. 2). The SAF Registration Store keeps information for registered vendors and information specific to the support applications.

Figure 9:
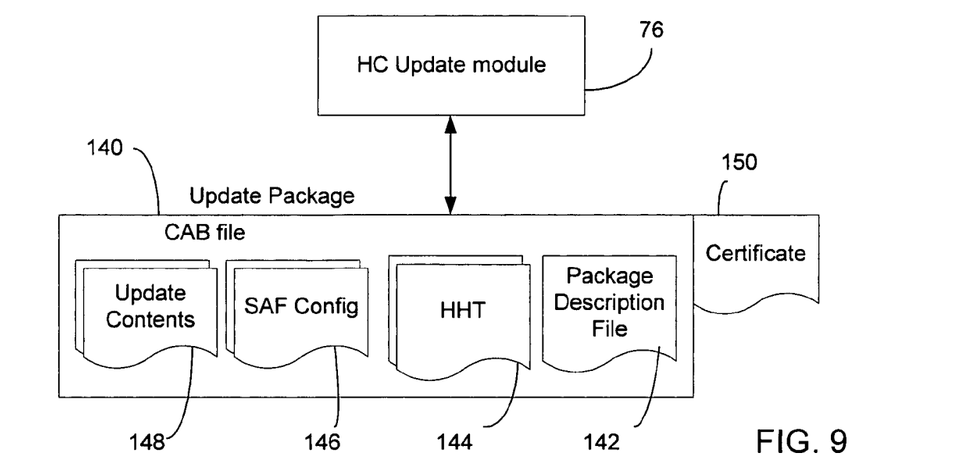
FIG. 9 is a schematic diagram showing the an update package for updating the Help Center of FIG. 2.
Figure 10:
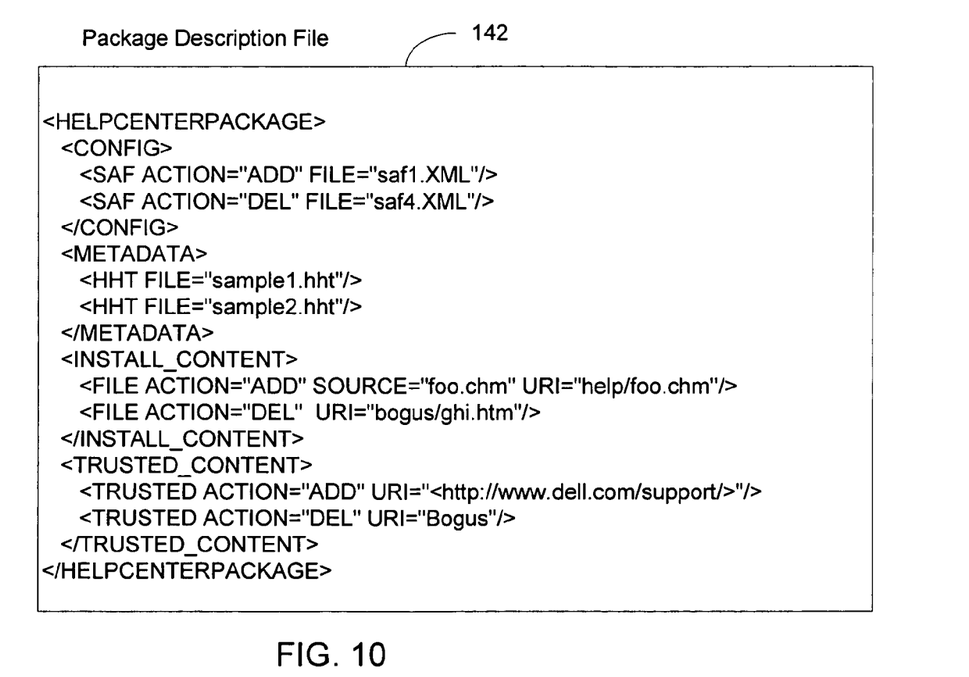
FIG. 10 is a schematic diagram showing an example of a package description file in the update package of FIG. 9.

One important feature of the unified help framework of the invention is its extensibility. In a preferred embodiment, various help contents can be added to or removed from the computer system, and their taxonomy mapping, index, and search keywords can be changed, by means of an update package. As shown in FIG. 9, in one implementation, the update package 140 is a single cabinet (CAB) file that may contain information for updating the HC Database, SAF Registration Store, the Content Store, and the local file system. For security reasons, the CAB file is preferably signed. The CAB file may have compressed therein a package description file 142, one or more HHT files 144, SAF Config files 146, and update contents 148. All of these components in the package except the Package description file are optional. The package description file 142, which is an XML file in one implementation, describes the other components contained in the update package, as well as actions to be taken with respect to them (e.g., adding or deleting). For illustration purposes, an example of such a package description file 142 is shown in FIG. 10. The HHT file 144, as described above, provides the mapping between the topics in the update contents 148 (if any) and the taxonomy. The SAF Config file 146 is used for registering with or removing from the SAF registration store a vendor connection through which active help contents may be accessed. The content portion of the update file contains CHM files as described above, HTML pages, or other things that are to be copied to the local file system. Contents that are copied to the local file system for use under the hcp:// namespace are stored on a per vendor basis under the main Help Center directory.

When the Help Center (HC) Update program 76 receives the update package 140, it first verifies that the package is signed by a proper authority to ensure that the package did come from a trusted source, such as a vendor. To this end, the package includes a certificate 150 (FIG. 9) that holds the vendor's name, a public key and other information, all of which are signed by the Certificate Authority using a private key. The HC Update program uses the certificate management APIs of the operating system to verify that the certificate was not tampered with. The certificate management APIs are also used to extract the name and identification data of the vendor from the certificate.

After the certificate 150 has been authenticated, the Update Package file 140 is then uncompressed to obtain the individual components therein. The package description file 142 is parsed to determine from its contents how the updates are to be performed. For instance, if the package description file 142 indicates that the update package includes content files to be copied, such files are copied into the specified location for that vendor under the Help Center main directory on the local file system. If the package includes HHT files, those files are parsed, and the metadata therein are used to update the HC database. If there are SAF Config files, they are sent along with the vendor name and identification to a SAF Registration API for updating the SAF Registration Store. If the contents portion of the package includes data that are identified as TRUSTED_CONTENT in the package description file, such "trusted contents" are used to update the Contents Store.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A computer-readable medium having computer-executable components for execution on a computer for presenting a plurality of help topics for software components installed on the computer and hardware components installed on the computer, comprising:

a help content store for storing help contents for the help topics, the help content store having a plurality of separate vendor folders corresponding to different vendors of a plurality of different software components installed on the computer and a plurality of different hardware components installed on the computer, each vendor folder containing help contents of respective help topics provided by a corresponding vendor, the help contents usable by a unified taxonomy structure of help categories and help topics, wherein a first vendor corresponds to a first component selected from the plurality of different software components and the plurality of different hardware components and a second vendor corresponds to a second component selected from the plurality of different software components and the plurality of different hardware components, the first vendor and the second vendor being included in the different vendors;

a help database containing mapping data for mapping the help topics from the different vendors into the unified taxonomy structure of help categories and help topics, the unified taxonomy structure being common to and inclusive of the help topics provided by the different vendors, and a first level of categories and a second level of categories in the unified taxonomy structure being predefined, static, and used by all the different vendors of software components installed on the computer and hardware components installed on the computer, the mapping data including data for each help topic for identifying a node position of said each help topic in the unified taxonomy structure and a location of corresponding help content of said each help topic in the help content store;

a help content update module for updating the help contents in the help content store and the mapping data in the help database based on update packets received from the vendors;

a help application for providing a user interface for presenting the help topics to a user, the help application being programmed to interactively display the unified taxonomy structure using the mapping data in the help database and the help contents in the content store, including displaying the help categories and the help topics in the unified taxonomy structure in response to user selections, retrieving a user-selected help topic contents, and displaying the user-selected help topic contents; and a script library for storing a plurality of script library objects used in the help contents of the help topics stored in the help content store, wherein the script library objects are operative to collect system operation information, and upload the system operation information to a vendor associated with the script library object; and an authorization store for storing information identifying which of the help contents are authorized to access the script library objects, wherein accessing the script library objects comprises accessing at least one of the following: a local database, and a remote database, wherein accessing the remote database requires that a Uniform Resource Locator (URL) associated with the remote database is listed in a local content store.

2. A computer-readable medium as in claim 1, wherein the help application is further programmed to check the authorization store to determine whether the help content of the user-selected help topic is allowed to access the script library objects.

3. A computer-readable medium as in claim 1, wherein the mapping data for each help topic include a parent ID identifying a parent node of said each help topic in the unified taxonomy structure, and a URL identifying a location of the help content of said each help topic in the help content store.

4. A computer-readable medium as in claim 1, wherein the help content update module is programmed to add, move, and remove help topics from the unified taxonomy structure by updating the mapping data in the help database.

5. A computer-readable medium as in claim 1, wherein the help database contains data specifying a search keyword associated with said each help topic.

6. A computer-readable medium as in claim 5, wherein the help database contains data specifying an index string associated with said each help topic.

7. A computer-readable medium as in claim 6, wherein the user interface provided by the help application includes an interface element presenting an option to view index strings of the help topics.

8. A computer-readable medium as in claim 1, wherein the help contents of the help topics are written in a mark-up language.

9. A computer comprising:

a plurality of software components installed on the computer and hardware components installed on the computer;

a help content store for storing help contents for help topics for software components installed on the computer and hardware components installed on the computer, the help content store having a plurality of separate vendor folders corresponding to different vendors of the software components installed on the computer and hardware components installed on the computer, each vendor folder containing help contents of respective help topics provided by a corresponding vendor, the help contents usable by a unified taxonomy structure of help categories and help topics, wherein a first vendor corresponds to a first component selected from the plurality of different software components and the plurality of different hardware components and a second vendor corresponds to a second component selected from the plurality of different software components and the plurality of different hardware components, the first vendor and the second vendor being included in the different vendors;

a help database containing mapping data for mapping the help topics from the different vendors into the unified taxonomy structure of help categories and help topics, the unified taxonomy structure being common to and inclusive of the help topics provided by the different vendors, and a first level of categories and a second level of categories in the unified taxonomy structure being predefined, static, and used by all the different vendors of software components installed on the computer and hardware components installed on the computer, the mapping data including data for each help topic for identifying a node position of said each help topic in the unified taxonomy structure and a location of corresponding help content of said each help topic in the help content store, the mapping data stored in a mapping data file including an action field configurable to include data to indicate whether the contents or mapping of the topics are to be at least one of the following: added, removed, and updated;

a help content update module for updating the help contents in the help content store and the mapping data in the help database based on update packets received from the vendors;

a help application for providing a user interface for presenting the help topics to a user, the help application being programmed to interactively display the unified taxonomy structure using the mapping data in the help database and the help contents in the content store, including displaying the help categories and the help topics in the unified taxonomy structure in response to user selections, retrieving a user-selected help topic contents, and displaying the user-selected help topic contents; and a script library for storing a plurality of script library objects used in the help contents of the help topics stored in the help content store, wherein the script library objects are operative to collect system operation information, and upload the system operation information to a vendor associated with the script library object; and an authorization store for storing information identifying which of the help contents are authorized to access the script library objects, wherein accessing the script library objects comprises accessing at least one of the following: a local database, and a remote database, wherein accessing the remote database requires that a Uniform Resource Locator (URL) associated with the remote database is listed in a local content store.

10. A computer as in claim 9, wherein the help application is further programmed to check the authorization store to determine whether the help content of the user-selected help topic is allowed to access the script library objects.

11. A computer as in claim 9, wherein the mapping data for each help topic includes a parent ID identifying a parent node of said each help topic in the unified taxonomy structure and a URL identifying a location of the help content of said each help topic in the help content store.

12. A computer as in claim 9, wherein the help content update module is programmed to add, move, and remove help topics from the unified taxonomy structure by updating the mapping data in the help database.

13. A computer as in claim 9, wherein the help database contains data specifying a search keyword associated with said each help topic.

14. A computer as in claim 13, wherein the help database contains data specifying an index string associated with said each help topic.

15. A computer as in claim 14, wherein the user interface provided by the help application includes an interface element presenting an option to view index strings of the help topics.

16. A computer comprising:

a plurality of software components installed on the computer and hardware components installed on the computer;

a help content store for storing help contents for help topics for software components installed on the computer and hardware components installed on the computer, the help content store having a plurality of separate vendor folders corresponding to different vendors of the software components installed on the computer and hardware components installed on the computer, each vendor folder containing help contents of respective help topics provided by a corresponding vendor, the help contents usable by a unified taxonomy structure of help categories and help topics, wherein a first vendor corresponds to a first component selected from the plurality of different software components and the plurality of different hardware components and a second vendor corresponds to a second component selected from the plurality of different software components and the plurality of different hardware components, the first vendor and the second vendor being included in the different vendors;

a help database containing mapping data for mapping the help topics from the different vendors into the unified taxonomy structure of help categories and help topics, the unified taxonomy structure being common to and inclusive of the help topics provided by the different vendors, and a first level of categories and a second level of categories in the unified taxonomy structure being predefined, static, and used by all the different vendors of software components installed on the computer and hardware components installed on the computer, the mapping data including data for each help topic for identifying a node position of said each help topic in the unified taxonomy structure and a location of corresponding help content of said each help topic in the help content store, the mapping data stored in a mapping data file including an action field configurable to include data to indicate whether the contents or mapping of the topics are to be at least one of the following: added, removed, and updated, wherein the mapping data for said each help topic includes a parent ID identifying a parent node of said each help topic in the unified taxonomy structure and a URL identifying a location of the help content of said each help topic in the help content store;

a help content update module for updating the help contents in the help content store and the mapping data in the help database based on update packets received from the vendors, wherein the help database contains data specifying a search keyword associated with said each help topic and contains data specifying an index string associated with said each help topic, wherein the help content update module is programmed to perform at least one of the following: add the help topics, move the help topics, and remove the help topics from the unified taxonomy structure by updating the mapping data in the help database;

a help application for providing a user interface for presenting the help topics to a user, wherein the user interface provided by the help application includes an interface element presenting an option to view index strings of the help topics, the help application being programmed to interactively display the unified taxonomy structure using mapping data in the help database and help contents in the content store, wherein the help application being programmed to interactively display the unified taxonomy structure displays the help categories and the help topics in the unified taxonomy structure in response to user selections, retrieving help contents of a user-selected help topic, and displaying the help content of the user-selected help topic;

a script library for storing a plurality of script library objects used in the help contents of the help topics stored in the help content store, wherein the script library objects are operative to collect system operation information, and upload the system operation information to a vendor associated with the script library object; and an authorization store for storing information identifying which of the help contents are authorized to access the script library objects, wherein accessing the script library objects comprises accessing at least one of the following: a local database, and a remote database, wherein accessing the remote database requires that a Uniform Resource Locator (URL) associated with the remote database is listed in a local content store.

* * * * *